United States Patent [19]

Vaupel et al.

[11] Patent Number: 5,227,990

[45] Date of Patent: Jul. 13, 1993

[54] PROCESS FOR TRANSMITTING AND RECEIVING A SIGNAL

[75] Inventors: Thomas Vaupel, Essen; Detlef Krahe, Kempen; Gerhard Dickopp, Krefeld-Bockum, all of Fed. Rep. of Germany

[73] Assignee: Telefunken Fernseh und Rundfunk GmbH, Hanover, Fed. Rep. of Germany

[21] Appl. No.: 824,848

[22] Filed: Jan. 17, 1992

[30] Foreign Application Priority Data

May 17, 1989 [DE] Fed. Rep. of Germany ....... 3915895
Oct. 6, 1989 [DE] Fed. Rep. of Germany ....... 3933475

[51] Int. Cl.$^5$ .............................................. G06F 15/31
[52] U.S. Cl. ................................................ 364/724.01
[58] Field of Search ........................... 364/724.01, 726; 381/36

[56] References Cited

U.S. PATENT DOCUMENTS 5,109,417 4/1992 Fielder et al. ..................... 381/36

FOREIGN PATENT DOCUMENTS 3506912 8/1986 Fed. Rep. of Germany .
WO90/14719 11/1990 World Int. Prop. O. .

OTHER PUBLICATIONS

Princen et al., "Analysis/Synthesis Filter Bank Design Based on Time Domain Aliasing Cancellation," IEEE Transactions of Acoustics, etc., vol. ASSP-34, No. 5, Oct. 1986, pp. 1153-1161.
Audio Engineering Society, Mar. 1989, Hamburg, Germany; Bernhard Feiten: "Spectral Properties of Audio Signals and . . . ".

Primary Examiner—Long T. Nguyen
Attorney, Agent, or Firm—Spencer, Frank & Schneider

[57] ABSTRACT

A signal is divided by windows into successive blocks that overlap at least by 50% and signal sections contained in the blocks are evaluated by analysis windows. The signal sections contained in the blocks are subjected to a transformation which permits sub-sampling with compensation of the aliasing components such as, for example, the "time domain aliasing cancellation" method. The spectra resulting from the transformation are subsequently coded, transmitted, decoded after transmission and changed back to signal sections by re-transformation. The blocks including the signal sections are evaluated by synthesis windows and are joined together in an overlapping fashion. The window functions of the synthesis windows are determined in dependence on the window functions of the corresponding analysis windows in the overlap region.

11 Claims, 3 Drawing Sheets

1. ANALYSIS AND SYNTHESIS WINDOWS ACCORDING TO B. FEITEN
(AES – HAMBURG '89)

2. ANALYSIS AND SYNTHESIS WINDOWS ACCORDING TO CONDITIONAL EQUATION

COMPARISON OF TIME DOMAIN ALIASING

ANALYSIS WINDOW ACCORDING
TO B. FEITEN

ANALYSIS WINDOW ACCORDING
TO CONDITIONAL EQUATION

PSUEDO MAGNITUDE AND PHASE FORMATION IN THE M<sup>th</sup> BLOCK:

| REAL/IMAGINARY COMPONENT | RE(0), 0 | RE(2), 0 | RE(4), 0 | RE(6), 0 ---- |
|---|---|---|---|---|
| REPRESENTATION | 0, IM(1) | 0, IM(3) | 0, IM(5) | 0, IM(7) ---- |
| PSUEDO MAGNITUDES AND PSUEDO PHASES | MAGN. (0) PHASE (0) | MAGN. (1) PHASE (1) | MAGN. (2) PHASE (2) | MAGN. (3) PHASE (3) |

FIGURE 6

PSUEDO MAGNITUDE AND PHASE FORMATION FROM THE COMBINATION OF THE M<sup>th</sup> BLOCK AND THE (M+1)<sup>th</sup> BLOCK:

| M<sup>th</sup> BLOCK | RE(0) 0 | 0 IM(1) | RE(2) 0 | 0 IM(3) | RE(4) 0 |
|---|---|---|---|---|---|
| (M+1)<sup>th</sup> BLOCK | 0 IM(0) | RE(1) 0 | 0 IM(2) | RE(3) 0 | 0 IM(4) |
| PSUEDO MAGNITUDES AND PSUEDO PHASES | MAGN. (0) PHASE (0) | MAGN. (1) PHASE (1) | MAGN. (2) PHASE (2) | MAGN. (3) PHASE (3) | MAGN. (4) PHASE (4) |

FIGURE 7

PROCESS FOR TRANSMITTING AND RECEIVING A SIGNAL

CROSS-REFERENCE TO RELATED APPLICATION

This application is a continuation of copending international application PCT/EP90/00795 filed May 17th, 1990, for which the United States of America has been designated and elected. The international application claims the priorities of German applications P 39 15 895.0 filed May 17th, 1989 and P 39 33 475.9 filed Oct. 6th, 1989, the rights of priority of both being claimed under 35 U.S.C. 119.

BACKGROUND OF THE INVENTION

1. Field of the Invention

The invention relates to a method of transmitting a signal.

2. Background Information

During the transmission of an audio signal, for example for radio broadcasts, cable transmissions, satellite transmissions and for recording devices, it is known to convert the analog audio signal into a digital audio signal of a certain resolution, to transmit it in that form and to convert it back into an analog signal for playback. The digital transmission results in a better signal to noise ratio particularly for playback.

The bandwidth required for the transmission of such a signal is essentially determined by the number of sampling values to be transmitted per unit time and by the resolution.

In practice, a requirement exists to keep the bandwidth necessary for transmission as small as possible in order to be able to make do with a narrow-band channel or transmit as many audio signals as possible simultaneously over a broad-band channel. The required bandwidth per se can be reduced by reducing the number of sampling values or the number of bits per sampling value. However, generally this measure results in worsening of playback quality.

In a method disclosed in DE-OS 3,506,912, the playback quality is improved in that the digital audio signal is divided into sections that are consecutive in time and the signal is transformed into a short-term spectrum which represents the spectral components of the signal for the respective time sections. In the short-term spectrum it is easier than in the time domain to locate components not discerned by the listener, that is, irrelevant components in a communications technology sense on the basis of psychoacoustic rules. These components are given less weight for transmission or are omitted entirely. Thus a considerable portion of the otherwise required data can be eliminated for transmission so that the average bit rate can be reduced considerably.

For the formation of the time sections, the signal is initially evaluated in the time domain by means of an analysis window and after transformation, coding, transmission, decoding and retransformation, it is ultimately evaluated by means of a synthesis window. The configuration of the analysis window influences frequency resolution as well as the quantity of data for transmission. Thus, windows having "hard" edges as exhibited, for example, by a rectangular window, have a poor frequency resolution. This is so because in the evaluated section the spectral components generated by the extremely steep signal rise and drop at the beginning and end of the window are added to the spectrum of the original signal. However, the time sections could be joined with one another without overlaps.

In the method disclosed in DE-OS 3,506,912 a window function has already been selected which has "softer" edges. Here, the beginning and end of the analysis window follow a cosine square function and the corresponding regions of the synthesis window follow a sine square function. The middle region of both windows has a constant value. With such a configuration of the window function, there already results an improved frequency resolution. However, in the region of the "soft" edges it is necessary for successive time sections to overlap. Because of the double transmission of the signals contained in this region, this leads to an increase in the average bit rate.

A further improvement in frequency resolution could be realized by an even less steep edge in the window function of the analysis window and by an expansion of the edge region within the window. However, such a measure inevitably requires a greater overlap of adjacent time sections.

If the edge region is expanded to the point that the window function no longer has a region with a constant value, adjacent time sections must overlap by 50%. This doubles the number of sampling values and correspondingly the quantity of data.

From the publications by J. P. Princen and A. B. Bradley, entitled "Analysis/Synthesis Filter Bank Design Based on Time Domain Aliasing Cancellation", in IEEE Transactions, ASSP-34, No. 5, October, 1986, pages 1153–1161, and by J. P. Princen, A. W. Johnson and A. B. Bradley, entitled "Suband[sic]/Transform Coding Using Filter Bank Design Based on Time Domain Aliasing Cancellation", in IEEE Int. Conference on Acoustics, Speech and Signal Processing, 1987, pages 2161–2164, it is known, in connection with a 50% overlap of successive time sections, to reduce the data quantity back to the original value in that only every second sampling value is coded. This proposal is based on the window functions for the analysis window and the synthesis window being the same. If the window functions are the same, the aliasing components occurring during the sub-sampling can be compensated after the evaluation by the synthesis window.

To improve frequency resolution, it may be appropriate to employ a specially configured window for the analysis so as to realize, for example, a slight initial rise in the window function. The advantage of such a window function is that a very high frequency resolution is realized for narrowband signal components, leading to a very effective bit assignment with low data rate during coding.

The lecture manuscript by B. Feiten, "Spectral Properties of Audio Signals and Masking with Aspect to Bit Data Reduction", 86th AES Convention, March, 1989, discloses the utilization of different window functions for analysis and synthesis and to employ these for time sections that overlap by 50%. However, the described graphic definition of the synthesis function does not result in compensation of the aliasing components after evaluation by means of the synthesis window.

SUMMARY OF THE INVENTION

It is therefore an object of the invention to improve the method for transmitting a signal to the extent that, with a freely selected analysis window, it is possible to determine a synthesis window which, when combined with the analysis window, compensates the aliasing components to zero.

This is accomplished in a method wherein a method for transmitting a signal comprising dividing the signal by windows into successive blocks that overlap by at least 50%, signal sections contained in the blocks being evaluated by analysis windows; subjecting the signal sections contained in the blocks to a transformation which permits sub-sampling with compensation of the aliasing components, said transformation performing time domain aliasing cancellation; wherein the spectra resulting from the transformation are subsequently coded, transmitted, decoded after transmission and changed back to signal sections by re-transformation; wherein the retransformed blocks including the signal sections are evaluated by synthesis windows and are joined together in an overlapping fashion; and wherein the window functions of the synthesis windows are determined in dependence on the window functions of the corresponding analysis windows in the overlap region.

Thus, the invention makes it possible to derive the synthesis window function mathematically accurately from the freely selectable analysis window function. In this way, the analysis window function can be optimally adapted to the conditions for high frequency resolution without this advantage being partially or completely outweighed by aliasing components during playback of the signal. The stated relationship also considers asymmetrical window functions. For symmetrical window functions, a modification provides for simplification of the calculation of the synthesis window.

BRIEF DESCRIPTION OF THE DRAWINGS

The invention will now be described with reference to an embodiment thereof that is illustrated in the drawing figures and will be compared with the prior art.

The drawing figures depict the following:

FIG. 6 is a table to illustrate the relationships between real and imaginary components, on the one hand, and pseudo magnitudes and pseudo phases, on the other hand, for an alternative of sub-sampling; and FIG. 7 is a table similar to FIG. 6 for another alternative of sub-sampling.

DETAILED DESCRIPTION OF THE PREFERRED EMBODIMENTS

Figure 1:
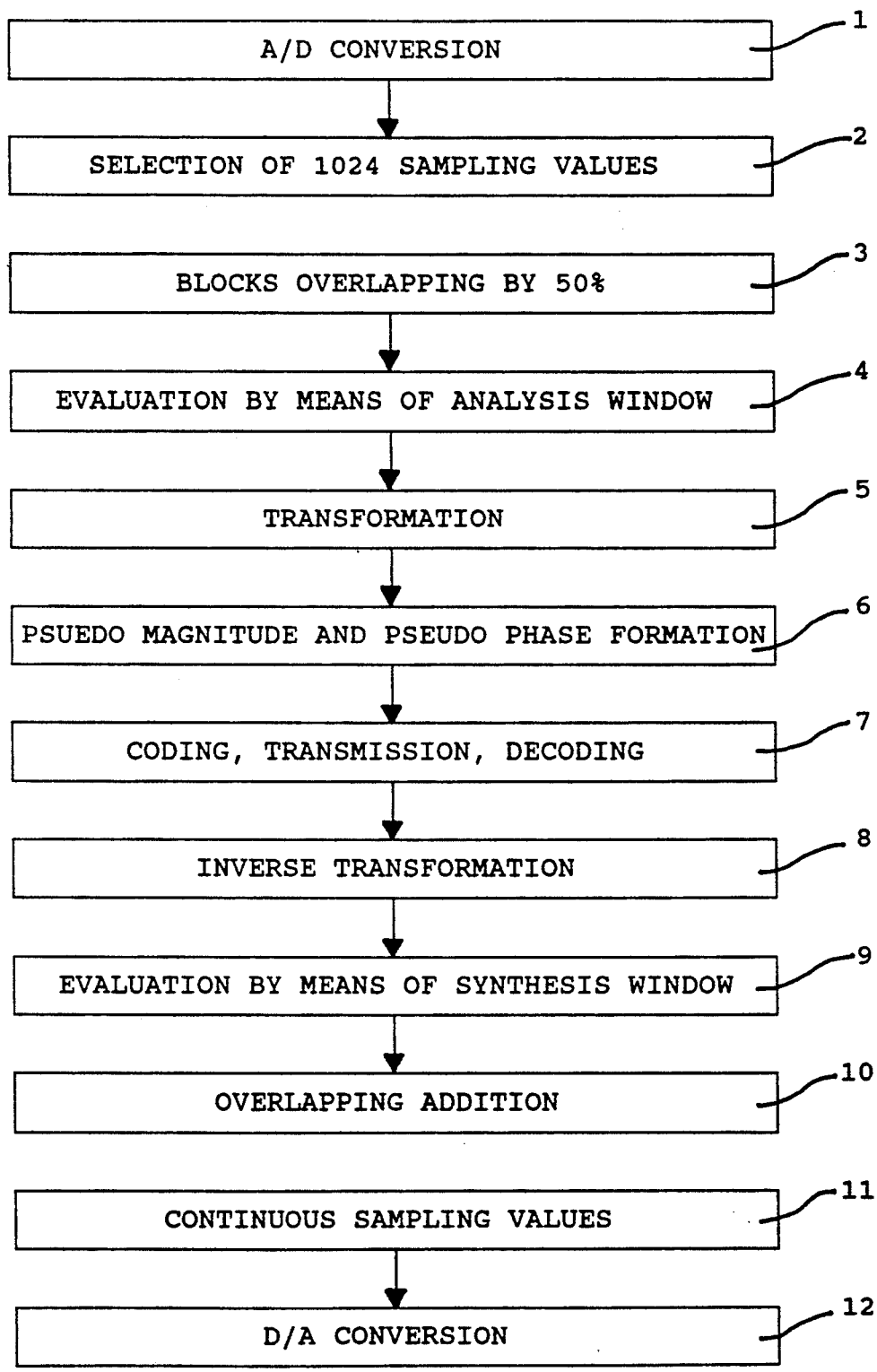
FIG. 1 is a flow chart showing the essential steps of the method according to an embodiment of the invention.

The flow chart of FIG. 1 shows the individual method steps for implementing the method according to an embodiment of the invention.

The starting value of the method is an analog audio signal which, according to Method Step 1, is converted into a digital signal in which amplitude values are available as sampling values in digitally coded form.

Method Step 2 puts windows on the continuous signal in that a series of successive sampling values, in the present case 1024 sampling values, are selected.

In Method Step 3, blocks are formed from the selected sampling values. These blocks overlap in time by 50%. That means that adjacent blocks partially contain the same sampling values but at different locations. Thus, the sampling values present in the first half of a respective block correspond to the sampling values present in the second half of the preceding block.

Figure 4:
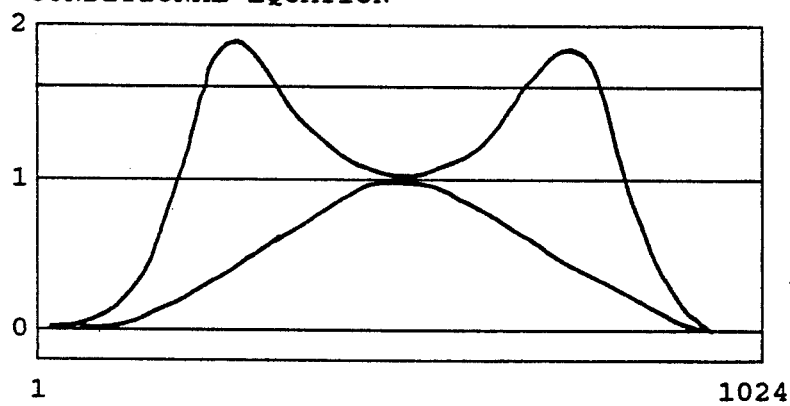
FIG. 4 is an illustration of analysis window and synthesis window according to an embodiment of the method of the invention.

In Method Step 4, the signal sections included in the blocks are evaluated by means of analysis windows. This produces a soft signal start and decay at the borders of the blocks, increasing the sharpness of the analysis during the subsequent transformation. A suitable analysis window is shown in FIG. 4 and will be discussed further below.

Method Step 5 constitutes the transformation of the previous time domain signal into a frequency domain signal. Instead of amplitude values, there now are spectral values. If the transformation is a Fourier transformation, the transformed values already each contain a real component and an imaginary component.

Then, in Method Step 6, the spectral values are converted into a form that includes pseudo magnitudes and pseudo phases. The spectral values are then processed and suitable for a transmission method as disclosed in DE-OS 3,506,912. Several alternatives are possible for this purpose, two of which are shown in the tables of FIGS. 6 and 7. In connection with the conversion of the spectral values, sub-sampling occurs simultaneously. In the end result, the number of values to be transmitted again coincides with the number of the original sampling values. The doubling of the data caused by the 50% overlap of the blocks has thus been cancelled out again.

The method step marked 7 is a combination of several individual steps including coding, possibly data reduction, transmission and decoding. These method steps may be performed according to the method disclosed in DE-OS 3,506,912.

In Method Step 8, a transformation now occurs which is the reverse of Method Step 5 but, if preceded by data reduction, the signal subjected to this transformation is free of psycho-acoustically redundant components. The inverse transformation again yields time domain signals in the form of signal sections of blocks representing a continuous signal. However, the blocks contain only half the original sampling values.

In the subsequent Method Step 9, the blocks are weighted by means of synthesis windows. The synthesis window functions are configured in such a way that they compensate signal distortions created by the weighting performed by means of the analysis windows in Method Step 4. The synthesis window functions employed here meet two criteria. Firstly, in the regions of overlap with the corresponding analysis windows, they supplement one another to equal one. Secondly, the analysis window mirrored in the middle of the overlap region multiplied by the synthesis window for block n minus the analysis window mirrored in the middle of the overlap region multiplied by the synthesis window for block n+1 in the overlap region equals zero. This latter criterion includes a compensation of the aliasing components.

In Method Step 10, the 50% overlapping blocks are added, with the aliasing components in the two blocks to be superposed occurring in each case with the opposite sign so that they are compensated to zero during the addition.

Method Step 11 constitutes the formation of continuous sampling values by joining the blocks including the windowed signal sections.

Finally, in the last method step marked 12, the digitally coded sampling values are converted into an analog signal which, although objectively lacking components, subjectively is considered to be identical with the original signal.

Figure 2:
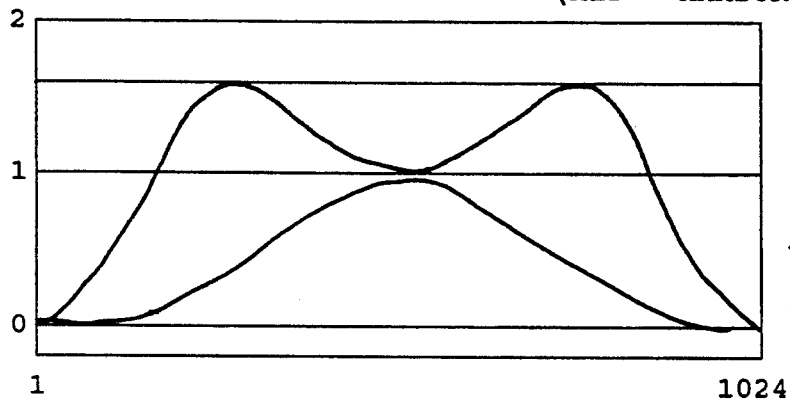
FIG. 2 is an illustration of an analysis window and a synthesis window according to a prior art method.
Figure 3:
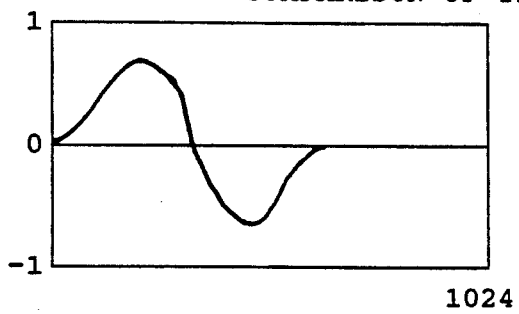
FIG. 3 is an illustration of the aliasing components for the window functions of FIG. 2.

FIG. 2 is an illustration of window functions, namely an analysis window and a synthesis window, as described in the publication by B. Feiten, entitled "Spectral Properties of Audio Signals and Masking with Aspect to Bit Data Reduction", 86th AES Convention, March, 1989. If the window functions shown in this illustration are employed in Method Steps 4 and 9 according to FIG. 1, the aliasing components shown in FIG. 3 will result. This is undesirable since the accuracy of the representation which has been improved by the greater precision of the analysis is in part cancelled out again.

FIG. 4 shows window functions, namely an analysis window and a synthesis window, in which the synthesis window function was calculated from the freely selected analysis window function according to the invention on the basis of the following equations:

$$s_n(t) = \frac{a_{n-1}(T_B/2 - t)}{a_n(T_B/2 - t) * a_{n+1}(t) + a_n(t) * a_{n+1}(T_B/2 - t)};$$

$$0 \leq t \leq T_B/2$$

$$s_{n+1}(t) = \frac{a_n(T_B/2 - t)}{a_n(T_B/2 - t) * a_{n+1}(t) + a_n(t) * a_{n+1}(T_B/2 - t)};$$

$$0 \leq t \leq T_B/2$$

In these equations:
$a_n(t)$ is the analysis window function for block n;
$s_n(t)$ is the synthesis window function for block n;
$a_{n+1}(t)$ is the analysis window function for block n+1;
$s_{n+1}(t)$ is the synthesis window function for block n+1;
and $T_B$ is the block time.

Figure 5:
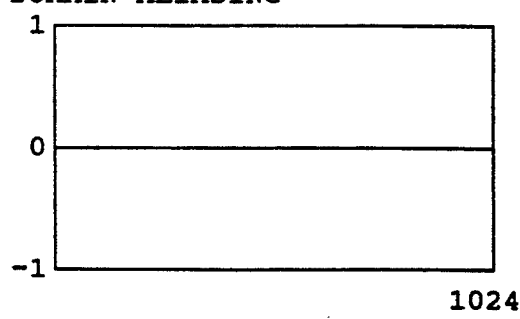
FIG. 5 is an illustration of the aliasing components for the window functions of FIG. 4.

The associated illustration of the aliasing components in FIG. 5 shows that here the aliasing components are compensated to zero, that is, the improved representation accuracy is fully utilized for playback of the signal.

While the above stated equation generally also considers asymmetrical windows, the following simplified equation can also be employed for symmetrical window functions as shown in FIG. 4.

$$s(t) = \frac{a(T_B/2 - t)}{a(T_B/2 - t) * a(t) + a(t) * a(T_B/2 - t)};$$

$$0 \leq t \leq T_B/2$$

In this equation:
a(t) is the analysis window function;
s(t) is the synthesis window function; and
$T_B$ is the block time.

The sub-sampling performed in Method Step 6 can be performed in such a way that, in the $m^{th}$ block, the real components of the spectral values having an even-numbered frequency index are employed for transmission as well as the imaginary components of the spectral values having an odd-numbered frequency index. In the (m+1) block, the real components of the spectral values having an odd-numbered frequency index and the imaginary components of the spectral values having an even-numbered frequency index are employed for transmission. Thus, for a block having N values and an overlap of about 50%, only N/4 real components and N/4 imaginary components are required for transmission.

If the spectra are to be processed in a codec [coder/decoder] that requires a representation of the magnitude and phase, it is necessary to have magnitude and phase values of the spectral values. For this purpose, the real and imaginary components must be converted to the corresponding magnitude and phase values.

The tables shown in FIGS. 6 and 7 show the formation of pseudo magnitudes and pseudo phases from real and imaginary components during the transformation of the signal into a frequency domain signal and the selection of the values for sub-sampling.

In the alternative shown in the table of FIG. 6 a pseudo magnitude and pseudo phase representation is formed in that the real components of the spectral values having the frequency indices n are combined in each case with the adjacent imaginary components of the spectral values having the frequency indices n+1 to yield magnitude and phase. This results in N/4 magnitudes and N/4 phases. This is shown in FIG. 6.

In another alternative shown in FIG. 7, two successive blocks are combined in each case. Pseudo magnitude and pseudo phase are calculated from the real components of the $m^{th}$ block and the imaginary components of the $(m+1)^{th}$ block having the same frequency index. Thus, for two blocks one obtains N/2 magnitudes and N/2 phases.

In a further alternative, the formation of pseudo magnitudes and pseudo phases becomes clear if a modified cosine and sine transformation is performed as the transformation.

Initially the 50% overlapping blocks are subjected alternatingly block by block to a modified cosine transformation according to the following equation:

$$y(k) = D_k \sum_{n=0}^{N-1} x(n) * \cos\left[\frac{(2n + 1 + N/2)k\pi}{2N}\right];$$

$$0 \leq k \leq N - 1$$

where
y represents the spectral values;
k represents the indices of the spectral values;
D is a constant according to the following definition:

$D_0$ (for k=0)=$\sqrt{N}$; $D_k$=$\sqrt{2/N}$; $1 \leq k \leq N-1$;

x represents the time values;
n represents the indices of the time values of the sampling; and
N represents the number of sampling values within a block.

Then the blocks are subjected to a modified sine transformation according to the following equation:

$$y(k) = D_k \sum_{n=0}^{N-1} x(n) * \sin\left[\frac{(2n + 1 + N/2)k\pi}{2N}\right];$$

$$1 \leq k \leq N$$

where y represents the spectral values;
k represents the indices of the spectral values;
D is a constant according to the following definition;

$$D_k = \sqrt{2/N};\ 1 \leq k \leq N-1;\ D_N = \sqrt{N}$$

x represents the time values;
n represents the indices of the time values of the sampling; and
N represents the number of sampling values within a block.

During the return transformation, the blocks are subjected to an inverse transformation relative to the forward transformation.

Both transformations furnish real spectral values. They are accordingly not directly suitable for coding according to magnitude and phase as in the case of a Fourier transformation.

From the resulting spectral values, the even-numbered values are selected, thus making the number of spectral values that are now employed only half the number of the original values.

Then complex values are formed from the spectral values of every two successive overlapping blocks in that, for example, the values of the first block are multiplied by 1 and the values of the second block are multiplied by j and equal-index values of the two blocks are added. This results in complex values which can be separated according to magnitude and phase. Since the respective real and imaginary components of the complex values do not originate from one and the same block, they are called pseudo magnitude and pseudo phase values.

The thus obtained pseudo spectrum generally has great similarity with respect to magnitude and phase to the Fourier spectrum of the two overlapping blocks being considered insofar as the time duration of the individual blocks does not significantly exceed about 20 ms. Due to their similarity, methods that were optimized according to magnitude and phase for the coding of genuine Fourier spectral values are suitable for coding the pseudo spectral values, for example, the method disclosed in DE-OS 3,506,912.

We claim:

1. A communication method for use in a communications system having a transmitter and receiver, comprising:
  dividing a signal using windows into successive blocks that overlap by at least 50%, signal sections contained in the blocks being evaluated with analysis windows;
  subjecting the signal sections contained in the blocks to a transformation which permits sub-sampling with compensation of aliasing components, said transformation performing time domain aliasing cancellation;
  wherein spectra resulting from the transformation are subsequently transmitted from the transmitter to a receiver and are changed back to blocks having signal sections by retransformation;
  wherein the retransformed blocks having the signal sections are evaluated with synthesis windows and are joined together in an overlapping fashion; and
  wherein window functions of the synthesis windows are determined in dependence on window functions of corresponding analysis windows in the overlap region, according to the following equations:

$$s_n(t) = \frac{a_{n-1}(T_B/2 - t)}{a_n(T_B/2 - t) * a_{n+1}(t) + a_n(t) * a_{n+1}(T_B/2 - t)};$$

$$0 \leq t \leq T_B/2$$

$$s_{n+1}(t) = \frac{a_n(T_B/2 - t)}{a_n(T_B/2 - t) * a_{n+1}(t) + a_n(t) * a_{n+1}(T_B/2 - t)};$$

$$0 \leq t \leq T_B/2$$

where
  $a_n(t)$ is the analysis window function for block n;
  $s_n(t)$ is the synthesis window function for block n;
  $a_{n+1}(t)$ is the analysis window function for block n+1;
  $s_{n+1}(t)$ is the synthesis window function for block n+1; and $T_B$ is the block time.

2. A method according to claim 1, wherein, for symmetrical windows, the window functions of the synthesis windows are determined in dependence on the window functions of the analysis windows according to the following equation:

$$s(t) = \frac{a(T_B/2 - t)}{a(T_B/2 - t) * a(t) + a(t) * a(T_B/2 - t)};$$

$$0 \leq t \leq T_B/2$$

where
  a(t) is the analysis window function;
  s(t) is the synthesis window function; and
  $T_B$ is the block time.

3. A method according to claim 1, wherein the sub-sampling is effected so that, after the transformation, in the $m^{th}$ block, the real components of the spectral values having an even-numbered frequency index and the imaginary components of the spectral values having an odd-numbered frequency index and, in the $(m+1)^{th}$ block, the imaginary components of the spectral values having an even-numbered frequency index and the real components of the spectral values having an odd-numbered frequency index, are selected for coding and transmission.

4. A method according to claim 1, wherein the sub-sampling is effected so that, after the transformation, a pseudo magnitude and pseudo phase representation is formed in that the real components of the spectral values having the frequency indices n are each combined with the adjacent imaginary components of the spectral values having the frequency indices n+1 to form magnitude and phase.

5. A method according to claim 1, wherein the sub-sampling is effected so that, after the transformation, two successive blocks are combined and a pseudo magnitude and pseudo phase representation is formed in that, in each case, the real components of the spectral values of the $m^{th}$ block and the imaginary components of the spectral components of the $(m+1)^{th}$ block having the same frequency indices are selected and magnitude and phase are calculated therefrom.

6. A method according to claim 1, wherein the transformation is a modified cosine transformation which is performed alternatingly block by block according to the following equation:

$$y(k) = D_k \sum_{n=0}^{N-1} x(n) * \cos\left( \frac{(2n + 1 + N/2)k\pi}{2N} \right),$$

$$0 \leq k \leq N - 1$$

where y represents the spectral values;
k represents the indices of the spectral values;
D is a constant according to the following definition:

$D_0$ (for k=0)=$\sqrt{N}$; $D_k$=$\sqrt{2/N}$; $1 \leq k \leq N-1$;

x represents the time values;
n represents the indices of the time values of the sampling; and
N represents the number of sampling values within a block, with a modified sine transformation being performed according to the following equation:

$$y(k) = D_k \sum_{n=0}^{N-1} x(n) * \sin\left( \frac{(2n + 1 + N/2)k\pi}{2N} \right),$$

$$1 \leq k \leq N$$

where y represents the spectral values;
k represents the indices of the spectral values;
D is a constant according to the following definition;

$D_k$=$\sqrt{2/N}$; $1 \leq k \leq N-1$; $D_N$=$\sqrt{N}$ x represents the time values;
n represents the indices of the time values of the sampling; and
N represents the number of sampling values within a block, with an inverse transformation relative to the forward transformation being performed for the re-transformation.

7. A method according to claim 6, wherein from the available spectral values, the even-numbered spectral values are selected and then complex values are formed from the spectral values that have been employed in that, from the spectral values of every two successive overlapping blocks, the values of the first block are multiplied by 1 and the values of the second block are multiplied by j and the values having the same indices in the two blocks are added together.

8. A communication method for use in a communications system having a transmitter and receiver, comprising:

performing analog to digital conversion on an analog signal to form digital samples;
selecting a series of successive sampling values from the digital samples;
forming blocks that overlap in time by fifty percent from the selected sampling values, wherein adjacent blocks partially contain the same sampling values but at different locations, the sampling values in a first half of a respective block corresponding to sampling values in a second half of a preceding block;
evaluating the formed blocks using analysis windows, wherein at borders of the formed blocks, a soft signal start and decay is produced;
transforming the formed blocks from the time to the frequency domain to thereby produce spectral values;
converting the spectral values into a form containing pseudo magnitudes and pseudo phases, and simultaneously sub-sampling, to produce a result in which a doubling of data caused by the fifty percent overlapping of the formed blocks is cancelled out;
transmitting the result of the converting and sub-sampling step from the transmitter to a receiver;
inverse transforming the spectral values in the transmitted result from the frequency domain to the time domain to produce blocks, wherein the produced blocks contain only one-half of the sampling values of the originally formed blocks;
evaluating the produced blocks using synthesis windows to compensate for the evaluation performed by the analysis windows, wherein window functions of the synthesis windows, in a region of overlap with a corresponding analysis window, supplement each other to equal one, and the analysis window mirrored in the middle of the overlap region multiplied by a synthesis window for block n, minus the analysis window mirrored in the middle of the overlap region multiplied by a synthesis window for block n+1 in the overlap region, equals zero;
adding fifty percent overlapping blocks, aliasing components in two blocks to be added occurring in each case with the opposite sign so that the aliasing components are compensated to zero during the addition;
joining the blocks resulting from the addition to form continuous sampling values; and
performing digital to analog conversion on the continuous sampling values to form an analog signal.

9. The method of claim 8, further comprising performing data reduction prior to transmitting.

10. The method according to claim 8, wherein the sub-sampling is performed so that, in the $m^{th}$ block, the real components of the spectral values having an even-numbered frequency index are employed for transmission as well as the imaginary components of the spectral values having an odd-numbered frequency index, and in the (m+1) block, the real components of the spectral values having an odd-numbered frequency index and the imaginary components of the spectral values having an even-numbered frequency index are employed for transmission, whereby for a block having N values and an overlap of about fifty percent, only N/4 real components and N/4 imaginary components are required for transmission.

11. The method according to claim 8, wherein the transforming step to transform the blocks from the time to the frequency domain to thereby produce spectral values comprises performing Fourier transformation.

* * * * *

UNITED STATES PATENT AND TRADEMARK OFFICE
CERTIFICATE OF CORRECTION

PATENT NO. : 5,227,990
DATED : July 13, 1993
INVENTOR(S) : Thomas Vaupel et al.

It is certified that error appears in the above-indentified patent and that said Letters Patent is hereby corrected as shown below:

On title page, item [60] add the following:
This Appln is a cont' of PCT/EP90/00795 05/17/90
    Item [73] "Hanover" should read --Hannover--.

Signed and Sealed this

Twelfth Day of April, 1994

Attest:

BRUCE LEHMAN

Attesting Officer

Commissioner of Patents and Trademarks